(12) United States Patent
Selvaraj

(10) Patent No.: US 8,687,313 B2
(45) Date of Patent: Apr. 1, 2014

(54) DISK DRIVE MAPPING OUT DATA TRACKS TO AVOID THERMAL ASPERITIES

(75) Inventor: Gomez Sam Vasanthan Selvaraj, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 335 days.

(21) Appl. No.: 13/167,559

(22) Filed: Jun. 23, 2011

(65) Prior Publication Data
US 2012/0327533 A1 Dec. 27, 2012

(51) Int. Cl.
G11B 21/02 (2006.01)
G11B 5/596 (2006.01)

(52) U.S. Cl.
USPC .......................... 360/75; 360/78.04

(58) Field of Classification Search
None
See application file for complete search history.

(56) References Cited

U.S. PATENT DOCUMENTS

| | | | |
|---|---|---|---|
| 5,442,638 A | 8/1995 | Awad et al. | |
| 5,537,034 A | 7/1996 | Lewis | |
| 5,666,237 A | 9/1997 | Lewis | |
| 5,870,241 A | 2/1999 | Ottesen et al. | |
| 5,898,535 A | 4/1999 | Kawai | |
| 5,917,670 A | 6/1999 | Scaramuzzo et al. | |
| 6,034,831 A | 3/2000 | Dobbek et al. | |
| 6,052,804 A | 4/2000 | Thowe et al. | |
| 6,223,303 B1 | 4/2001 | Billings et al. | |
| 6,281,676 B1 | 8/2001 | Ottesen et al. | |
| 6,490,691 B1 | 12/2002 | Kimura et al. | |
| 6,504,662 B2 | 1/2003 | Sobey | |
| 6,552,880 B1 | 4/2003 | Dunbar et al. | |
| 6,567,229 B1 | 5/2003 | Mallary et al. | |
| 6,654,904 B1 | 11/2003 | Andoh et al. | |
| 6,985,319 B2 | 1/2006 | Yip et al. | |
| 7,032,127 B1 | 4/2006 | Egan et al. | |
| 7,139,145 B1 | 11/2006 | Archibald et al. | |
| 7,251,908 B2 | 8/2007 | Yori | |
| 7,457,069 B2 | 11/2008 | Yoshioka et al. | |
| 7,583,461 B2 | 9/2009 | Kudoh et al. | |
| 7,656,763 B1 | 2/2010 | Jin et al. | |
| 7,688,540 B1 | 3/2010 | Mei et al. | |
| 7,800,858 B1 | 9/2010 | Bajikar et al. | |
| 7,804,661 B2 * | 9/2010 | Wilcox et al. | 360/75 |
| 7,982,993 B1 | 7/2011 | Tsai et al. | |
| 8,014,245 B2 | 9/2011 | Chen et al. | |
| 8,194,338 B1 | 6/2012 | Zhang | |
| 2001/0048567 A1 | 12/2001 | Chng et al. | |
| 2002/0036858 A1 | 3/2002 | Bi et al. | |
| 2002/0091964 A1 | 7/2002 | Cheok et al. | |
| 2004/0190185 A1 | 9/2004 | Lee | |
| 2007/0153656 A1 | 7/2007 | Mahr et al. | |
| 2009/0052289 A1 | 2/2009 | Chen et al. | |
| 2012/0092975 A1 | 4/2012 | Jun | |

* cited by examiner

Primary Examiner — Andrew L Sniezek

(57) ABSTRACT

A disk drive is disclosed comprising a head actuated over a disk comprising a plurality of data tracks, wherein the head comprises a write element and a read element. An asperity in a target data track is detected, and a range of data tracks proximate the target data track is mapped out, wherein the range of data tracks spans at least twice a radial offset between the read element and the write element at the radial location of the target data track.

22 Claims, 5 Drawing Sheets

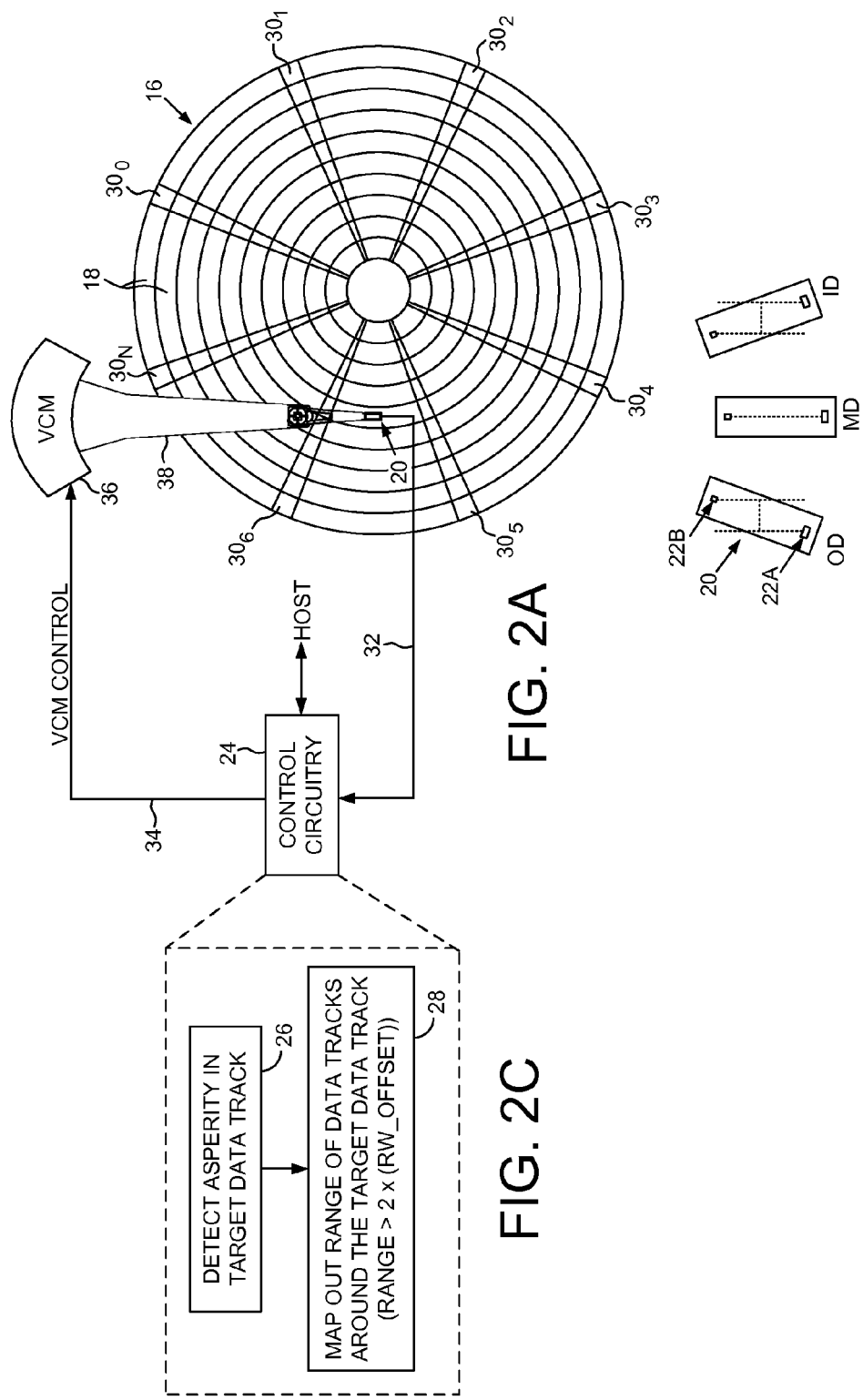

DISK DRIVE MAPPING OUT DATA TRACKS TO AVOID THERMAL ASPERITIES

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track ID) which is read by the head and processed by a servo controller to control the velocity of the actuator arm as it seeks from track to track.

FIG. 1 shows a prior art format of a disk 2 comprising a plurality of concentric servo tracks 4 defined by embedded servo sectors $6_0$-$6_N$. Each servo sector (e.g., servo sector $6_4$) comprises a preamble 8 for synchronizing gain control and timing recovery, a sync mark 10 for synchronizing to a data field 12 comprising the coarse head positioning information (such as a Gray coded track ID), and servo bursts 14 which provide fine head positioning information.

As the disk rotates at high speeds, an air bearing forms between the head and the disk such that the head flies just above the disk surface in close proximity. An asperity may manifest on the disk surface due to a manufacturing defect of the disk, contaminates such as dust particles, friction particles due to the head sliding along a load/unload ramp, etc. If the head strikes an asperity, it can raise the temperature of the head (thus the term thermal asperity) resulting in unreliable write/read performance as well as physically damage to the head.

BRIEF DESCRIPTION OF THE DRAWINGS

FIG. 2A shows a disk drive according to an embodiment of the present invention comprising a head actuated over a disk.

FIG. 2B shows a head according to an embodiment of the present invention comprising a read element and a write element which are offset radial depending on the radial location of the head.

FIG. 2C is a flow diagram according to an embodiment of the present invention wherein when an asperity is detected in a target data track, a range of data tracks proximate the target data track is mapped out, wherein the range of data tracks spans at least twice a radial offset between the read element and the write element at the radial location of the target data track.

DETAILED DESCRIPTION OF EMBODIMENTS OF THE INVENTION

Figure 1:
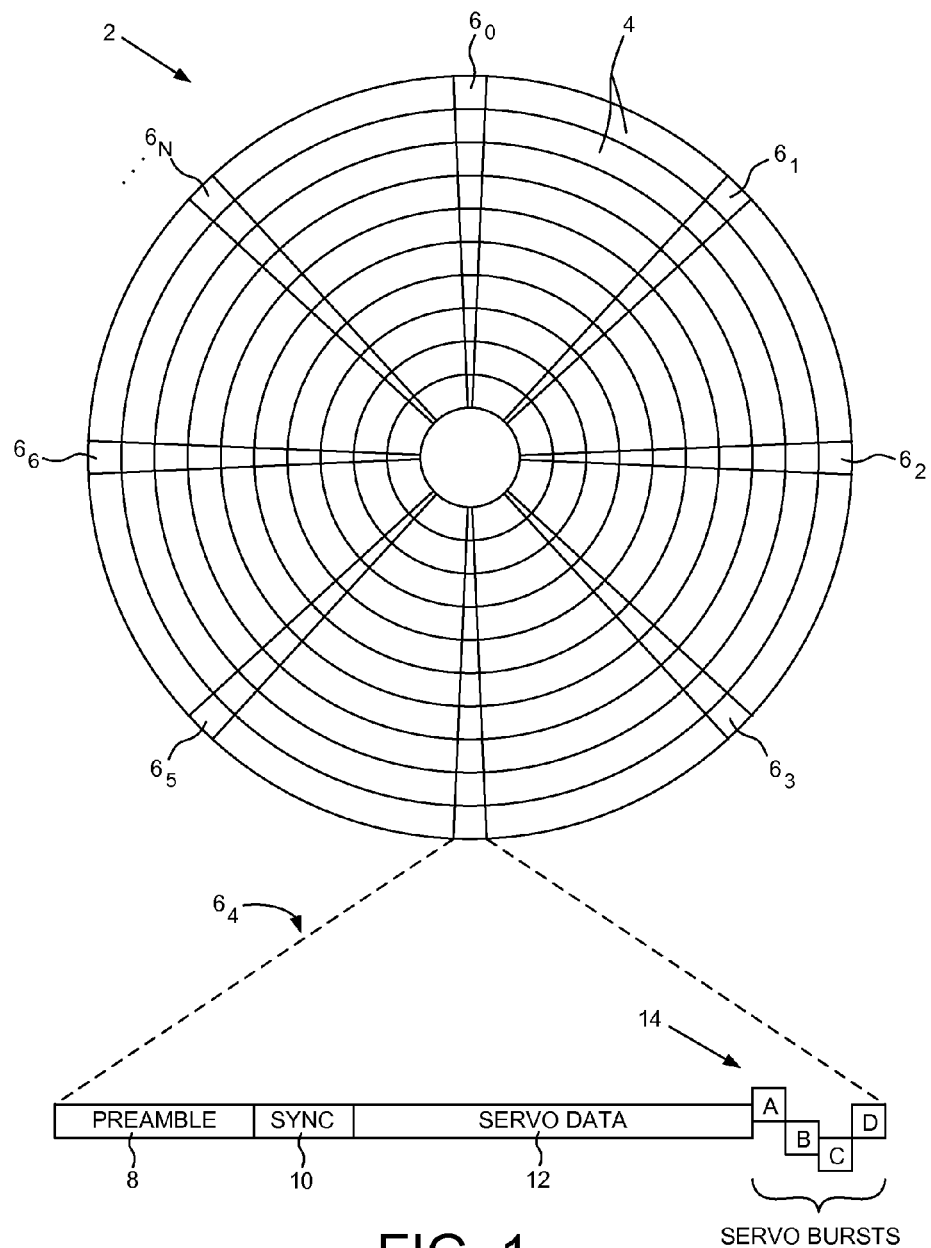
FIG. 1 shows a prior art disk format comprising a plurality of servo tracks defined by embedded servo sectors.

FIG. 2A shows a disk drive according to an embodiment of the present invention comprising a disk 16 having a plurality of data tracks 18, and a head 20 actuated over the disk 16, wherein the head 20 comprises a write element 22A and a read element 22B (FIG. 2B). The disk drive further comprises control circuitry 24 operable to execute the flow diagram of FIG. 2C, wherein an asperity is detected in a target data track (step 26). A range of data tracks proximate the target data track is mapped out (step 28), wherein the range of data tracks spans at least twice a radial offset between the read element and the write element at the radial location of the target data track.

In the embodiment of FIG. 2A, the disk 16 comprises embedded servo sectors $30_0$-$30_N$ that define the plurality of data tracks 18. The control circuitry 24 processes a read signal 32 emanating from the head 20 to demodulate the servo sectors $30_0$-$30_N$ and generate a position error signal (PES) representing an error between the actual position of the head and a target position relative to a target track. The control circuitry 24 filters the PES using a suitable compensation filter to generate a control signal 34 applied to a voice coil motor (VCM) 36 which rotates an actuator arm 38 about a pivot in order to actuate the head 20 radially over the disk in a direction that reduces the PES. The servo sectors $30_0$-$30_N$ may comprise any suitable position information, such as a track address for coarse positioning and servo bursts for fine positioning.

In the embodiment of FIG. 2B, there is a gap between the write element 22A and the read element 22B along the length of a data track which results in a radial offset between the write element 22A and the read element 22B depending on the radial location of the head 20 and corresponding skew angle of the head 20. As illustrated in FIG. 2B, in one embodiment the radial offset increases as the head 20 moves away from the middle diameter (MD) of the disk toward the outer diameter (OD) or the inner diameter (ID). In other embodiments, the write element 22A may be radially offset from the read element 22B when there is zero skew angle (due to a physical misalignment) such that the radial offset toward the OD may be different than the radial offset toward the ID. The radial offset may span multiple data tracks depending on the radial location of the head. To account for this radial offset, a jog value is introduced into the servo system so that during a write operation the read element 22B is servoed at a first radial location in order to position the write element 22A over a target data track. The radial offset is measured (estimated) across the stroke of the actuator arm so that a corresponding jog value can be derived based on the target data track to be written. In one embodiment, the control circuitry measures the radial offset at a plurality of discrete locations across the disk, and then extrapolates the data to estimate the radial offset for any given data track.

Figure 3A:
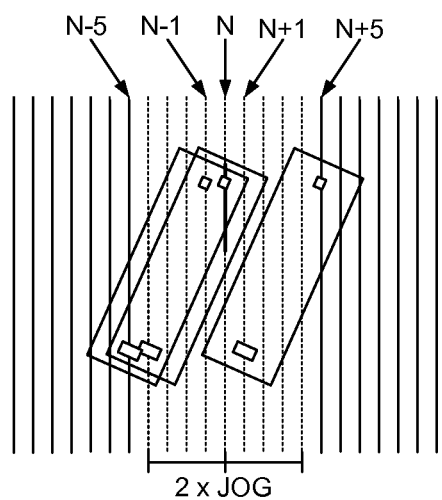
FIG. 3A illustrates an embodiment of the present invention wherein the range of data tracks mapped out around an asperity spans twice the radial offset between the read element and the write element.

FIG. 3A illustrates an embodiment of the present invention wherein a thermal asperity is detected at data track N. The thermal asperity may be detected using any suitable technique, such as by evaluating a perturbation in the read signal due to the read element 22B striking the thermal asperity. For example, there may be a sharp rise in the amplitude of the read signal when the read element 22B strikes the asperity due to a thermal affect. This is why asperities on the disk are typically referred to as thermal asperities.

In the embodiments of the present invention, a range of data tracks around an asperity are mapped out to avoid contact with the asperity. The range of data tracks mapped out is based on the radial offset between the write element 22A and the read element 22B. In the embodiment of FIG. 3A, the range of data tracks mapped out spans at least twice the radial offset between the write element 22A and the read element 22B. In this manner, neither the write element 22A nor the read element 22B should contact the asperity in data track N (ignoring off-track servo errors). In the example of FIG. 3A, the radial offset (jog) between the write element and the read element spans four data tracks, and therefore four data tracks on both sides of data track N are mapped out (i.e., data tracks N−4 through N+4 are mapped out). When writing to data track N−5 using the write element, the read element is servoed over data track N−1 and therefore avoids striking the asperity in data track N. When reading data track N+5 using the read element, the write element will be positioned at data track N+1 and therefore avoid striking the asperity in data track N. In one embodiment, a number of additional data tracks may be mapped out around an asperity to account for off-track errors that may occur while servoing the head over the disk near the asperity.

Figure 3B:
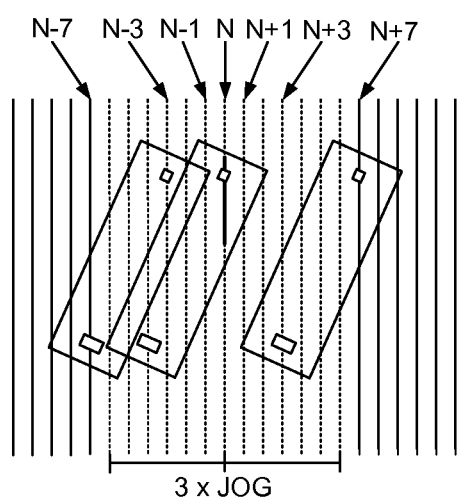
FIG. 3B illustrates an embodiment of the present invention wherein the range of data tracks mapped out is increased to three times the radial offset between the read element and the write element to account for the pole tips of the head.

Mapping out a range of data tracks around an asperity based on twice the jog value may not prevent the pole tips (corners) of the head from striking the thermal asperity as illustrated in FIG. 3A. Accordingly, in one embodiment the range may be extended to three times the jog value as illustrated in FIG. 3B to account for the pole tips (i.e., data tracks N−6 through N+6 are mapped out in FIG. 3B). When writing to data track N−7 using the write element, the read element is servoed over data track N−3 and therefore the pole tip avoids striking the asperity in data track N. When reading data track N+7 using the read element, the write element will be positioned at data track N+3 and therefore the pole tip avoids striking the asperity in data track N. In one embodiment, a number of additional data tracks may be mapped out around an asperity to account for off-track errors that may occur while servoing the head over the disk near the asperity.

Figure 4:
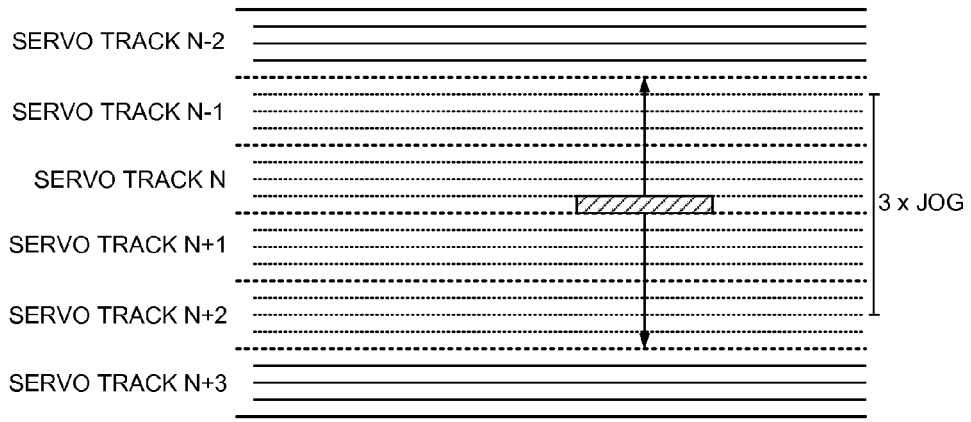
FIG. 4 illustrates an embodiment of the present invention wherein the range of data tracks mapped out is extended to a next servo track.

In one embodiment, the density of the servo tracks is less than the data tracks such that multiple data tracks may be defined between consecutive servo tracks. FIG. 4 shows an example of this embodiment wherein four data tracks are recorded between each servo track for at least part of the disk surface. In one embodiment, the range of data tracks mapped out around an asperity comprises a first range of at least twice the radial offset between the read element and the write element, and a second range comprising a number of data tracks defined by a boundary of the first range and a next servo track. In the example embodiment shown in FIG. 4, the first range comprises at least three times the radial offset between the read element and the write element (three times the jog value), and the second range comprises the data tracks defined by the boundary of the first range and the next servo track (i.e., extending up to servo track N−2 and servo track N+3). This embodiment provides additional margin by not servoing the head using the boundary servo tracks, thereby helping to avoid striking the thermal asperity due to off-track servo errors.

Figure 5:
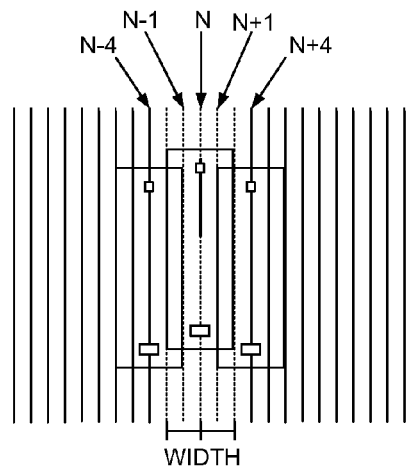
FIG. 5 illustrates an embodiment of the present invention wherein when the radial offset between the read element and write element is substantially zero, the range of data tracks mapped out spans a width of the head.

FIG. 5 illustrates an example embodiment of the present invention wherein when the radial offset between the read element and the write element is near a minimum (e.g., when the head is near the middle diameter of the disk), the range of data tracks mapped out around an asperity in data track N spans at least the width of the head so that the head avoids striking the thermal asperity when accessing data tracks N−4 and N+4. In one embodiment, the range of data tracks may be extended to account for off-track servo errors as described above, as well to account for error in estimating the head width or the possibility of head skew when the radial offset is substantially zero due to a physical misalignment of the read element relative to the write element.

Figure 6:
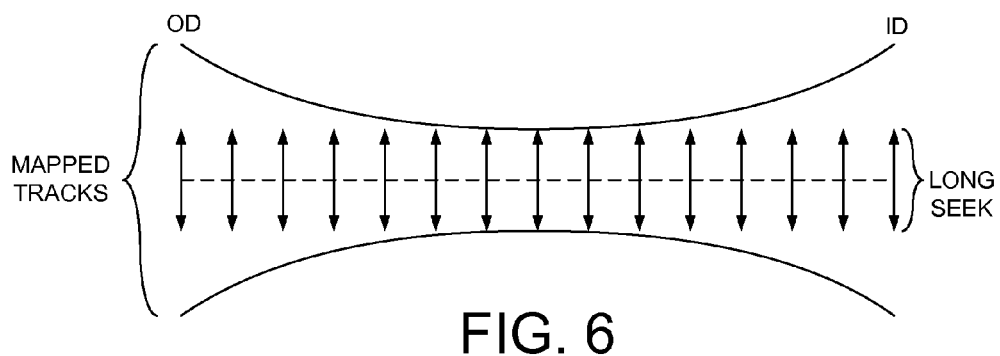
FIG. 6 shows an embodiment of the present invention wherein a long seek distance is defined by the range of data tracks mapped out when the radial offset between the read element and write element is substantially zero.

The head may comprises a suitable fly height actuator, such as a suitable heater or a suitable microactuator (e.g., a piezoelectric microactuator), and in one embodiment while seeking the head across the disk surface, the control circuitry increases the fly height of the head so that the head avoids striking the asperities. The control circuitry increases the fly height prior to any seek operation having a seek distance that is greater than the minimum range of tracks mapped out due to the asperities (referred to as a long seek distance). In one embodiment, the long seek distance corresponds to when the radial offset between the read element and the write element is near a minimum. FIG. 6 shows an embodiment wherein the radial offset is near a minimum when the head is positioned near the middle diameter of the disk, which also corresponds to the minimum number of data tracks mapped out around an asperity. The number of data tracks mapped out increases toward the outer diameter and inner diameter of the disk due the skew angle of the head as described above, but the long seek distance remains constant across the disk surface as illustrated in FIG. 6

Figure 7:
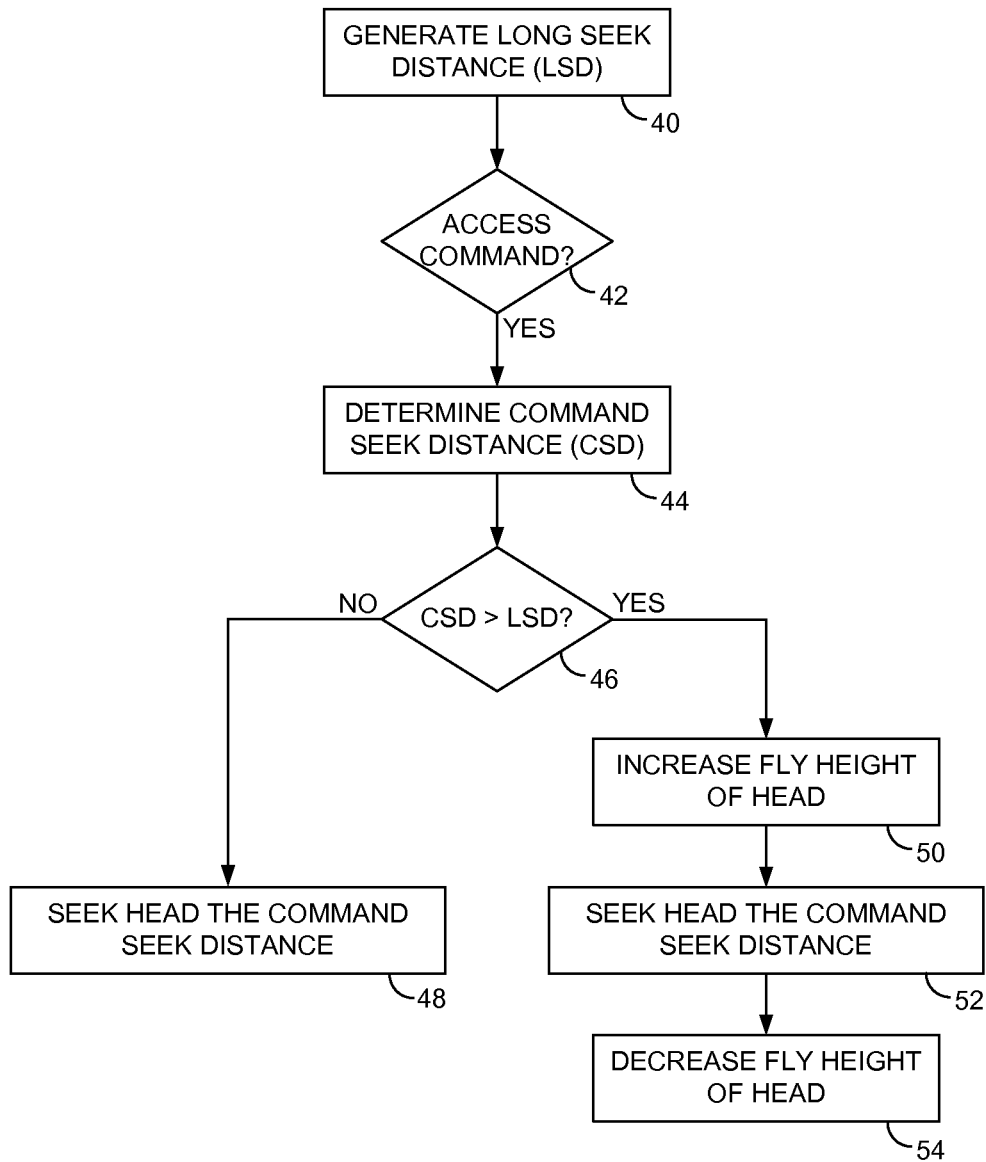
FIG. 7 is a flow diagram according to an embodiment of the present invention wherein when a command seek distance is greater than the long seek distance, the fly height of the head is increased during the seek in order to avoid any potential asperities.

This embodiment is understood with reference to the flow diagram of FIG. 7 wherein a long seek distance (LSD) is generated corresponding to when the radial offset between the read element and the write element is near a minimum (step 40). When an access command is to be executed (step 42), a command seek distance (CSD) is determined for the access command (step 44). When the CSD is less than the LSD (step 46), the control circuitry seeks the head the command seek distance (step 48) without increasing the fly height of the head. When the CSD is greater than the LSD (step 46), the control circuitry increases the fly height of the head (step 50), seeks the head the command seek distance (step 52), and then decreases the fly height of the head (step 54).

Increasing the fly height helps prevent the head from striking an asperity since any seek greater than the LSD has the potential of crossing over an asperity. This embodiment is relatively simple to implement as compared to maintaining a map of the asperity locations, and then adjusting the fly height based on the asperity map. When the command seek distance is less than the LSD, the fly height need not be increased because the head is attempting to access a data track within a range that was not mapped out due to a previously detected asperity, and therefore the head will not cross over a previously detected asperity during the seek.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head actuated over the disk, wherein the head comprises a write element and a read element; and
   control circuitry operable to:
      detect an asperity in a target data track; and
      map out a range of data tracks proximate the target data track, wherein the range of data tracks spans at least twice a radial offset between the read element and the write element at the radial location of the target data track.

2. The disk drive as recited in claim 1, wherein the range of data tracks spans at least three times the radial offset between the read element and the write element.

3. The disk drive as recited in claim 1, wherein:
   the disk comprises a plurality of servo tracks defined by servo sectors;
   the density of the servo tracks is less than the data tracks; and
   the range of data tracks spans:
      a first range of at least twice the radial offset between the read element and the write element; and
      a second range comprising a number of data tracks defined by a boundary of the first range and a next servo track.

4. The disk drive as recited in claim 1, wherein the control circuitry is further operable to measure the radial offset between the read element and the write element at a plurality of radial locations across the disk.

5. The disk drive as recited in claim 4, wherein the control circuitry is further operable to:
   generate a long seek distance corresponding to when the radial offset between the read element and the write element is near a minimum;
   seek the head radially over the disk in response to a command seek distance; and
   when the command seek distance is greater than the long seek distance, increase a fly height of the head during the seek.

6. The disk drive as recited in claim 5, wherein the long seek distance is at least as long as the range of data tracks mapped out.

7. A disk drive comprising:
   a disk comprising a plurality of data tracks;
   a head actuated over the disk, wherein the head comprises a write element and a read element; and
   control circuitry operable to:
      generate a long seek distance corresponding to when a radial offset between the read element and the write element is near a minimum;
      seek the head radially over the disk in response to a command seek distance; and
      when the command seek distance is greater than the long seek distance, increase a fly height of the head during the seek.

8. The disk drive as recited in claim 7, wherein the control circuitry is further operable to:
   detect an asperity in a target data track; and
   map out a range of data tracks proximate the target data track, wherein the range of data tracks spans at least twice the radial offset between the read element and the write element at the radial location of the target data track.

9. The disk drive as recited in claim 8, wherein the range of data tracks spans at least three times the radial offset between the read element and the write element.

10. The disk drive as recited in claim 8, wherein:
    the disk comprises a plurality of servo tracks defined by servo sectors;
    the density of the servo tracks is less than the data tracks; and
    the range of data tracks spans:
       a first range of at least twice the radial offset between the read element and the write element; and
       a second range comprising a number of data tracks defined by a boundary of the first range and a next servo track.

11. The disk drive as recited in claim 8, wherein the control circuitry is further operable to measure the radial offset between the read element and the write element at a plurality of radial locations across the disk.

12. A method of operating a disk drive, the disk drive comprising a head actuated over a disk comprising a plurality of data tracks, wherein the head comprises a write element and a read element, the method comprising:
    detecting an asperity in a target data track; and
    mapping out a range of data tracks proximate the target data track, wherein the range of data tracks spans at least twice a radial offset between the read element and the write element at the radial location of the target data track.

13. The method as recited in claim 12, wherein the range of data tracks spans at least three times the radial offset between the read element and the write element.

14. The method as recited in claim 12, wherein:
    the disk comprises a plurality of servo tracks defined by servo sectors;
    the density of the servo tracks is less than the data tracks; and
    the range of data tracks spans:
       a first range of at least twice the radial offset between the read element and the write element; and
       a second range comprising a number of data tracks defined by a boundary of the first range and a next servo track.

15. The method as recited in claim 12, further comprising measuring the radial offset between the read element and the write element at a plurality of radial locations across the disk.

16. The method as recited in claim 15, further comprising:
    generating a long seek distance corresponding to when the radial offset between the read element and the write element is near a minimum;
    seeking the head radially over the disk in response to a command seek distance; and when the command seek distance is greater than the long seek distance, increasing a fly height of the head during the seek.

17. The method as recited in claim 16, wherein the long seek distance is at least as long as the range of data tracks mapped out.

18. A method of operating a disk drive, the disk drive comprising a head actuated over a disk comprising a plurality of data tracks, wherein the head comprises a write element and a read element, the method comprising:
generating a long seek distance corresponding to when a radial offset between the read element and the write element is near a minimum;
seeking the head radially over the disk in response to a command seek distance; and
when the command seek distance is greater than the long seek distance, increasing a fly height of the head during the seek.

19. The method as recited in claim 18, further comprising:
detecting an asperity in a target data track; and
mapping out a range of data tracks proximate the target data track, wherein the range of data tracks spans at least twice the radial offset between the read element and the write element at the radial location of the target data track.

20. The method as recited in claim 19, wherein the range of data tracks spans at least three times the radial offset between the read element and the write element.

21. The method as recited in claim 19, wherein:
the disk comprises a plurality of servo tracks defined by servo sectors;
the density of the servo tracks is less than the data tracks; and
the range of data tracks spans:
a first range of at least twice the radial offset between the read element and the write element; and
a second range comprising a number of data tracks defined by a boundary of the first range and a next servo track.

22. The method as recited in claim 19, further comprising measuring the radial offset between the read element and the write element at a plurality of radial locations across the disk.

\* \* \* \* \*